April 28, 1970   J. E. FARNELL   3,508,882
STIRRED AUTOCLAVE

Filed Nov. 17, 1967   3 Sheets-Sheet 1

INVENTOR.
J. E. FARNELL
BY Alexander Kozel
AGENT

# United States Patent Office 3,508,882
Patented Apr. 28, 1970

3,508,882
STIRRED AUTOCLAVE
Jimmie E. Farnell, Pensacola, Fla., assignor to Monsanto Company, St. Louis, Mo., a corporation of Delaware
Filed Nov. 17, 1967, Ser. No. 683,841
Int. Cl. B01j 3/00
U.S. Cl. 23—285          1 Claim

ABSTRACT OF THE DISCLOSURE

An autoclave having a thermally heated lower and an unheated upper portion and a driven cylindrical cage stirrer overhanging a heating means therein providing an autoclave that resists formation and accrual of degradable residue and yields extended batch reacting of polymeric salt solutions.

BACKGROUND OF THE INVENTION

In the manufacture of a synthetic polymeric material such as nylon, autoclaves are commonly used to react or polymerize aqueous salt solutions under controlled pressure and temperature conditions. A conventional autoclave comprises a capped vessel completely surrounded by an external heating jacket charged with a heating medium as Dowtherm vapor. An autoclave includes inlets for charging with raw materials and additives, outlets for discharging polymer and condensate, vents for venting vapors, and pressure and temperature sensing devices. Some autoclaves utilize an internal heating coil.

In operating a conventional autoclave to process batch after batch of nylon salt, the interior walls of the autoclave become coated with a build up of degraded residue called "gel." In time, the decomposed encrustation loosens, breaks off and falls into the salt solution. Upon inspection of a contaminated polymer batch, the entrained deposits are readily identified and are referred to as "specks." Polymer containing contaminating "specks" or other degraded residue is off-standard and undesirable.

Due to the rapid formation of "gel" in a conventional autoclave, disassembling is required periodically for purposes of reconditioning and cleaning. The improved autoclave disclosed herein is designed to minimize conditions conducive to "gel" formation and to remain clean for extended periods.

SUMMARY OF THE INVENTION

The autoclave embodying the invention comprises a thermally jacketed vessel with an unjacketed cover sealingly clamped thereto. The cover has an inlet for introducing raw materials to the autoclave, and a discharge port is provided at the bottom of the vessel for removing solutions therefrom. A heating coil normally charged with Dowtherm vapor is mounted centrally within the jacketed vessel with coil inlet and outlet conduits extending through the bottom of the vessel. Preferably, the thermal jacket and heating coil are independent systems and are independently regulated. Stirring of a solution charged to the vessel is effected by a driven, helical ribbon stirrer that overhangs and surrounds the heating coil.

The improved autoclave provides uniform thermal and mixing conditions minimizing "gel" and residue accumulation.

DESCRIPTION OF THE PREFERRED EMODIMENTS

Figure 1:
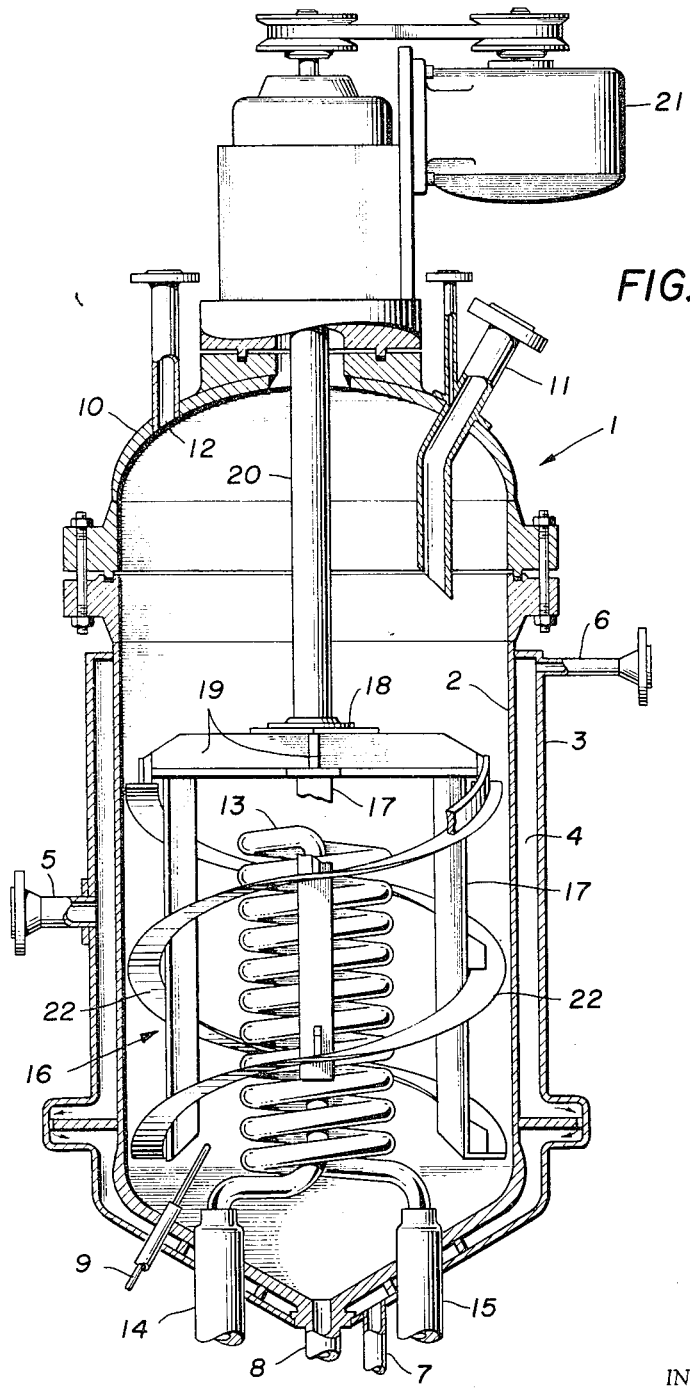
FIGURE 1 is a cross-section view of the autoclave with operating elements shown in full.

The autoclave 1, as illustrated in the drawing, comprises a reaction vessel 2 surrounded by a spaced jacket 3 defining a closed heating chamber 4 therearound. Preferably, jacket 3 does not extend to the top of the vessel 2 so that a short length adjacent the top is left unheated. Heating chamber 4 is normally charged with Dowtherm vapor delivered thereto through an inlet 5. A vapor vent 6 and a condensate discharge port 7 open into heating chamber 4. A polymer discharge opening 8 is provided at the bottom of vessel 2 and a thermocouple 9 extends into the vessel through jacket 3 and the vessel wall.

An unjacketed and unheated cover 10 is sealingly clamped to vessel 2 by conventional bolt means, and has at least one raw material inlet 11. A port or well 12 is illustrated for installation of pressure and temperature sensing devices or for other purposes as, for example, a vapor outlet. Generally, an autoclave cover includes other openings for the introduction of additives and for the installation of auxiliary gauges or valves. For purposes of simplicity these are not shown.

Figure 2:
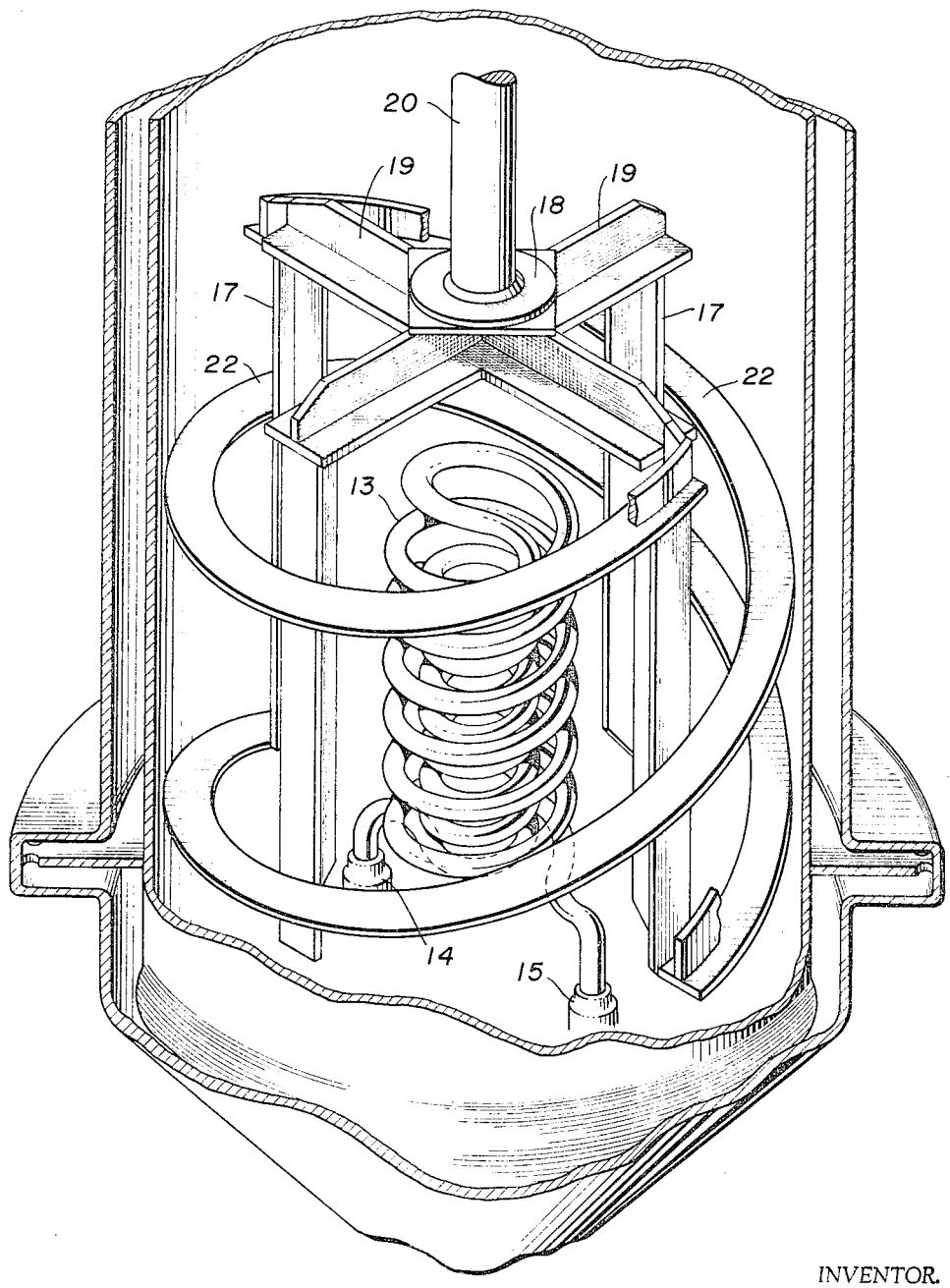
FIGURE 2 is a perspective view of the ribbon stirrer arrangement.

A heating coil 13 is centrally positioned within vessel 2 and has inlet and outlet conduits 14 and 15, respectively, extending through the bottom thereof. The heating coil 13 may be formed as a double coil as shown in FIG. 2.

A rotatable, ribbon flight stirrer 16 concentrically surrounds and depends over coil 13 and is spaced therefrom and from the sidewall of vessel 2. According to the illustrated embodiment, stirrer 16 comprises a cage support having a plurality of vertical, spaced beams 17 arranged in a circle and connected at the upper ends thereof to a transverse end piece or web 18 formed of cross-beams 19. End piece 18 is connected to the end of a drive shaft 20 extending sealingly through cover 10 and driven externally of vessel 2 by a motor 21 through a conventional belt drive arrangement.

Figure 3:
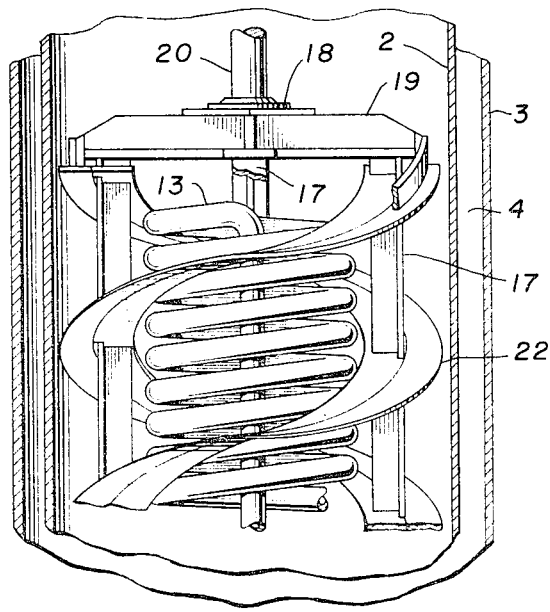
FIGURE 3 is a fragmentary perspective view showing a preferred construction.

A pair of helicoid, flat ribbon flights 22, each off-set 180° from the other, are secured as by welding to beams 17 and spiral either in right-hand or left-hand turns therearound. Preferably, the clearance between the helical ribbons 22, the coil 13 and the vessel 2 is of close tolerance to keep the polymer adjacent the vessel and coil walls stirred thereby preventing the formation of stagnant polymer areas and improving heat transfer in the polymer pool, as shown in FIG. 3.

In operation, the thermal chamber 4 and heating coil 13 are charged with Dowtherm vapor and a salt solution is delivered to the autoclave through inlet 11. Vessel 2 is charged to a level approximating the height of the jacketed portion thereof, and at this level stirrer 16 and coil 13 will be covered with salt solution. After properly closing off all the required ports as by valves (not shown), stirrer 16 is driven at a desired speed and the salt solution is then processed through controlled pressure and temperature cycles for effecting polymerization of the batch. At the completion of the process, the batch is discharged via port 8 and a new batch is procsssed.

The improved autoclave provides many advantages over the conventional type. It is simple in structure and is designed to minimize "gel" collecting surfaces. The overhanging helical ribbon cage arrangement does not require the use of bearings operable within the polymer melt pool. Bearings immersed in a melt pool are often a source of maintenance problems. In conventional autoclaves the entire structure including the cover is enveloped in a heat jacket. Upon inspection of such autoclaves after a period of operation it can be noted that a large collection of "gel" is found on the inner surface of the cover and on the inside surface of the autoclave above the normal level of the aqueous solutions processed. To avoid or to reduce the collection of "gel" on these surfaces, the improved autoclave is constructed with unheated surfaces above the solution level as it was believed that the heated surfaces contributed to the formation of residue on the upper walls splashed repeatedly by polymeric solution.

The stirrer 16 and heating coil 13 arrangement are designed to be of such a height that they are always operating immersed in a polymer pool which, as mentioned above, will have a predetermined upper level not above the heated or jacketed portion of vessel 2.

A conventional autoclave requires cleaning after about 300 batch operations. A ribbon stirred autoclave, as illustrated in the drawings, was used to process over 300 batches of nylon salt before dismantling for inspection and cleaning. A most significant improvement in the condition of the inside of the autoclave was observed. The interior of the autoclave as well as the operating components therein, did not have a build up or collection of "gel" characteristic of a conventional autoclave. It has been determined that even after processing 1200 batches of nylon salt or four times the usual amount in the improved autoclave that the inner surfaces and components remained relatively clean and collected only a small amount of residue not of a proportion to cause contamination. The "cleaner" operating conditions are attributed primarily to more uniform heat transfer and more even or uniform stirring of the polymer solution in the autoclave.

Other advantages are provided. In conventional autoclaves control of foaming conditions is a constant requirement. In the improved autoclave foaming is reduced to an extent that it no longer places a limitation on processing. The improved autoclave provides a wider range of temperature control than a conventional autoclave thus offering greater processing flexibility. Uniform heating and stirring minimizes occurrence of local areas of overheating and stagnation. Efficient heating and stirring reduces the time required to process a batch of salt solution and thus increases the productive capacity of the improved autoclave. Because the improved autoclave operates in a "clean" condition, it is versatile and adaptable for processing batches of different polymeric solutions interchangeably and without interruption.

It will be understood that variations and modifications of the illustrated embodiment of the autoclave disclosed are expected to be covered within the purview of the invention and that limitations are only expected within the scope of the claim.

I claim:
1. An autoclave comprising:
   a closed vessel having a heat jacketed lower portion, an unheated upper portion, and means defining an inlet and discharge opening,
   a heating coil positioned centrally within said vessel and having inlet and outlet conduits extending through the bottom of said lower vessel portion;
   rotatable stirring means including at least one ribbon stirrer spacingly surrounding said heating coil and carried on a circular cage that surrounds and overhangs said heating coil,
   drive means extending through said upper vessel portion and connected to said stirring means for driving the latter.

References Cited

UNITED STATES PATENTS 3,049,413   8/1962   Sifford _____ 23—285
3,054,729   9/1962   Smith _____ 165—94 XR JAMES H. TAYMAN JR., Primary Examiner U.S. Cl. X.R.

23—290; 165—94, 109; 259—8, 97; 260—95